Oct. 13, 1953  E. R. ATKINS  2,655,391
HIGH-TEMPERATURE AND PRESSURE PACKING GLAND
Filed May 8, 1950

INVENTOR:
EARLE R. ATKINS
BY HIS ATTORNEYS
HARRIS, KIECH, FOSTER & HARRIS

Patented Oct. 13, 1953

2,655,391

UNITED STATES PATENT OFFICE 2,655,391

HIGH-TEMPERATURE AND PRESSURE PACKING GLAND

Earle R. Atkins, Whittier, Calif.

Application May 8, 1950, Serial No. 160,786

9 Claims. (Cl. 285—97.1)

This invention relates to packed joints for the handling of high temperature and pressure fluids.

Heretofore in the moving of liquids under high pressures, and especially through swivel joints, it has been extremely difficult to prevent leakage or insure long life of the packing material, particularly where high temperatures have been involved, or very high pressure, or both.

It is therefore the principal object of this invention to provide a structure for packed joints, especially but not limited to those of a swivel type, wherein relatively long life and freedom from leakage may be attained even where uncommon high pressures and high temperatures are encountered.

A more specific object of the invention is to provide a packed joint construction of such nature that appropriate packing material may be readily forced into grooved or similar seat structures and retained therein under pressure, the grooving or kindred formation offering, in combination with the packing material adequate obstruction to fluid flow for long periods of time regardless of pressure and temperature conditions.

It is also an object of the invention to provide such a packing which is efficient both for fixed applications, rotary shaft joints, joints of the swivel type, and the like.

Other objects of the invention and various features of construction will become apparent to those skilled in the art upon reference to the accompanying drawing wherein certain embodiments of the improvement are illustrated.

In the drawing:

Fig. 4 is a fragmentary detail illustrating the application of the invention for packing a shaft entering a rotary type pump or the like.

Figure 1:
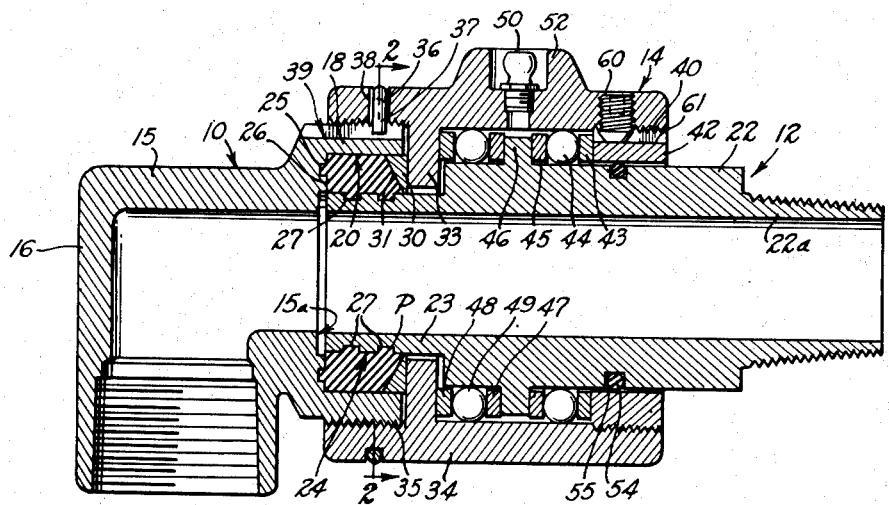
Fig. 1 is a longitudinal section through one form of swivel joint embodying my invention.

The drawing illustrates an outer joint member 10 and an inner joint member 12 which may be taken as typical of various joint members provided with the high pressure packing improvement hereof. This form is also illustrative of swivel joints for which this invention is particularly valuable, the swiveling section of the joint being generally indicated at 14.

The outer joint member 10 comprises an annular body 15 having any appropriate flow connection 16 which, in the form shown is directed laterally of the axis of the joint but might be directed otherwise as desired. The body 15 is provided with an integral annular head 18 which is countersunk or bored internally to provide an internal annular seat 20 for the reception of packing material P.

The inner member 12 comprises an annular body 22 provided with an outer flow connection 22a and a reduced inner end 23 formed with an external annular seat 24 disposed opposite the seat 20 and arranged in contact with the packing P. Preferably the body 15 is machined to provide a countersink 15a so that the extremity of the reduced inner end 23 of the body 22 may lie slightly therein if required.

Figure 3:
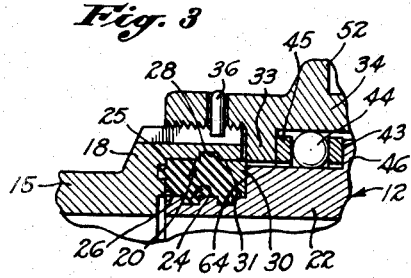
Fig. 3 is a fragmentary sectional detail illustrating a slight possible modification.

I have found that, in order to prevent high pressure fluids such as hot liquids from passing along the walls of the seats 20 and 24 at the surface of the packing P, the employment of one or more annular grooves in each of the seats 20 and 24, into which grooves the packing P is forced, completely checks liquid seepage, even for high pressure material such as hot petroleum oils, sulfuric acid and the like, even up to pressures of 7,000 lbs. and higher. Thus, where the annular seat 20 has been used, the provision of a right angled annular groove 25 in the inner end wall 26 of the seat 20, and two right angled annular grooves 27 in the straight annular seat 24 of the reduced end 23 of the inner member effectively prevents leakage of liquids under the severe temperature and pressure conditions above indicated, and such valuable results have endured for a given packing installation over many months of use. An additional annular groove 28, as indicated in Fig. 3, may be provided if necessary or desirable.

For the purpose of insuring adequate compression and proper retention of the packing P in operative relationship as illustrated, a wedge ring 30 having an appropriately sloped compressing wall 31 is positioned against the packing P in the end of the packing space between the seats 20 and 24.

Figure 2:
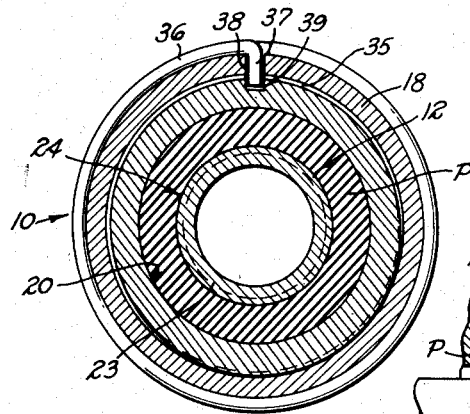
Fig. 2 is a cross section taken from the line 2—2 of Fig. 1.

In the case of a swivel joint, such as that illustrated and possessing the swiveling section 14, an internal bearing rib or abutting compression flange 33 is integrally carried by a bearing-retaining external swivel sleeve 34. The compression flange 33 is held in operative relationship against the wedge ring 30 through the medium of an internal threaded connection 35 at one end of the sleeve 34, which connection is formed by internal cooperating threads on the sleeve 34 engaging with external threads on the annular head 18 of the outer member 10. When the sleeve 34 is screwed up on the head 18 to effect proper compression of the packing P through the medium of the wedge ring 30, accidental unthreading may be prevented through the medium of a snap ring 36 engaged in a corresponding external annular groove in the sleeve 34, the snap ring 36 having an inwardly offset locking finger 37 (Fig. 2) which projects through a hole 38 in the sleeve 34 and into a retention groove 39 cut longitudinally across the threads of the head 18.

The swivel section 14, comprising the swivel sleeve 34, provides means for retaining the inner joint member 12 and its annular body 22 in the operative position illustrated. This is effected through the medium of the swivel-bearing structure disclosed and an internal threaded connection 40, by means of which the end of the sleeve 34 opposite from the threads 35 engages and retains a thrust ring 42 bearing against a bearing ring 43 which engages ball bearings 44 in turn working against a bearing ring 45 which is itself borne against an outstanding annular flange or rib 46 secured upon the annular body 22, as by the integral construction illustrated or otherwise as desired. By these means the inner reduced end 23 of the body 22 of the inner joint member 12 is retained in the required operative relationship with respect to the packing P and the packing seat 20 of the head 18 of the outer joint member 10. The bearing structure for the swivel head is completed by duplicating the bearing rings 43 and 45 and the ball bearings 44 at the opposite side of the rib 46, this being accomplished through the medium of bearing ring 47 disposed against the rib 46, a bearing ring 48 disposed against the internal flange 33 of the swivel sleeve 34, and ball bearings 49 retained between the rings 47 and 48. For the purpose of providing proper lubrication of the swivel structure just described, a lubricant nipple 50 is provided in the sleeve 34, this nipple being protected by an upstanding boss 52 shown as integral with the sleeve 34. In order to insure retention of lubricant, an appropriate sealing ring 54 is positioned in an appropriate groove 55 in the adjacent end portion of the annular body 22, this sealing ring 54 bearing against the inner wall of the thrust ring 42 in sealing relationship somewhat as indicated. Locking of the thrust ring 42 against rotational movement in the swivel sleeve 34 may be effected through the medium of a set screw 60 engaged in a detent seat 61 at the rear of the outer threads 40, or by a snap ring like snap ring 36 used at the other end of the swivel sleeve 34, and which, if desired, could be replaced by another set screw 60.

In Fig. 3, there is shown a slight modification wherein the angular packing seat 20 in the head 18 of the outer member 10 is retained, and the straight seat 24 of the inner end 23 of the inner member 12 is combined with a radially extending annular inner wall 64 which is opposed to the end wall 26 of the seat 20 and serves to perform the function of the innermost portion of the compression flange 33 of the form of Fig. 1. Thus, the wall 64, under influence of the inner body 22, its annular rib 46, the bearing means 43, 44, 45 and the thrust bearing ring 42 retained by the swivel sleeve 34, provides for adequate compression of the packing P.

The described means employing the various shoulders or obstruction walls provided by the annular grooves 25 and 27, and the groove 28 if desired, in the seats 20 and 24, in conjunction with the proper compression of the packing P, serve efficiently for relatively long periods of time to prevent leakage under unusually high pressures, such as 7,000 lbs. as previously mentioned, even where high temperatures are employed and refractory fluids are being handled, such as represented by hot petroleum fractions, sulfuric acid, and other liquids.

Figure 4:
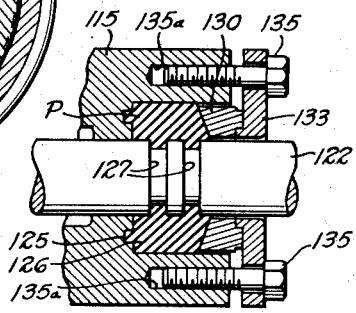

Fig. 4 illustrates the employment of the packing of this invention upon shafts of rotary apparatus such as rotary pumps. Here a rotating shaft 122 is the joint member corresponding with the annular body 22 of Figs. 1 and 3 and is provided with annular grooves 127 to receive portions of packing material P, the shaft entering a body member 115 on a pump housing or the like corresponding with the body 15 of the other forms. An inner end wall 126 of the body member 115 is provided with an annular end groove 125 adapted to receive portions of the packing material P. As in the other forms, a wedge ring 130 bears against the packing material P, this ring being engaged by an end plate 133 which is retained by adjusting screws 135 entering threaded slots 135a in the body member 115. Thus, the same type of packing construction is provided for the shaft 122 of Fig. 4 as for the swivel members 22 of Figs. 1 and 3.

In addition to the specific forms illustrated, it is intended to protect all other variations which fall within the scope of the patent claims.

I claim as my invention:

1. In combination in a swivel joint for conducting fluids: a hollow joint member having a bore therein provided with an annular, angular seat for receiving packing material; a rotary member having a first portion adapted to be received in said joint member adjacent said seat and in engagement with packing material therein; means on said joint member overhanging an intermediate portion of said rotary member; bearing means disposed between said overhanging means and said intermediate portion and centering the latter in the former, said first portion of said rotary member and portions of said joint member about said seat forming a space for receiving packing material, each of said seat and said first portion having groove means formed therein facing said space; packing material filling said space and said groove means, each groove means providing a plurality of angular means for engaging said packing material and serving in combination therewith as resistance means to prevent fluid flow between said packing material and adjacent walls of said members; and mechanical compression means bearing against said packing material and placing the same under compression to force the latter into said groove means, said compression means including wedge means positioned in said space and bearing upon said packing material in compression relationship, and a rigid, internal, annular rib on said overhanging means and abutting said wedge means in compression relationship to compress said packing.

2. In combination in a high-pressure and high-temperature resistant packing device: outer and inner relatively rotary members to be packed, said outer member providing an annular packing-receiving chamber having an end wall and an annular wall; said inner member entering said outer member and providing a second annular wall opposite and within said annular wall of said outer member with said packing-receiving chamber between said annular walls, said members providing between them adjacent said end wall an annular joint to be packed, said annular wall of said inner member having an endless annular groove providing opposed side walls and providing opposed sharp angles at the opposite sides of the bottom of such groove, said side walls and said annular wall of said inner member providing sharp shoulders at their junctures, one of said walls of said outer member also having an endless annular groove providing opposed side walls and providing opposed sharp angles at the opposite sides of the bottom of such groove, the side walls and said one wall of said outer member providing sharp shoulders at their junctures, said annular grooves being spaced appreciable distances from said joint to form packing-engaging annular wall portions between said joint and said grooves; a packing material compressed in said chamber and into said grooves and following said sharp angles and shoulders and engaging said walls and wall portions and the side walls of said grooves; and compression means opposed to said end wall and engaging and compressing said packing material.

3. A combination as in claim 2 wherein said annular groove in said outer member is located in said end wall.

4. A combination as in claim 2 wherein the walls containing said annular grooves extend beyond the side walls of the respective grooves remote from said joint and provide additional wall portions engaged by said packing material.

5. A combination as in claim 4 wherein said inner member rotates within the outer member and has a second endless annular groove therein spaced from the first mentioned annular groove therein.

6. In combination in a high-pressure and high-temperature resistant packing device: outer and inner relatively rotary members to be packed, said outer member providing an annular packing-receiving chamber having an end chamber wall and an annular chamber wall, said inner member entering said outer member and providing a second annular chamber wall opposite and within said annular chamber wall of said outer member with said packing-receiving chamber between said annular chamber walls, said members providing between them adjacent said end wall an annular joint to be packed, said annular wall of said inner member having an endless annular groove providing side walls and providing at least one sharp angle at the bottom of such groove, said side walls and said annular wall of said inner member providing sharp shoulders at their junctures, one of said walls of said outer member also having an endless annular groove providing side walls and providing at least one sharp angle at the bottom of such groove, the side walls and said one wall of said outer member providing sharp shoulders at their junctures, said annular grooves being spaced appreciable distances from said joint to form packing-engaging annular wall portions between said joint and said grooves; yielding packing material compressed in said chamber and into said grooves and following said sharp angles and shoulders and engaging said chamber walls and wall portions and the side walls of said grooves; and compression means opposed to said end wall and engaging and compressing said packing material.

7. A combination as in claim 6 wherein said annular groove of said outer member is located in said end wall.

8. A combination as in claim 6 wherein the walls containing said annular grooves extend beyond the side walls of the respective grooves remote from said joint and provide additional wall portions engaged by said packing material.

9. A combination as in claim 6 wherein said inner member rotates within the outer member and has a second endless annular groove therein spaced from the first mentioned annular groove therein.

EARLE R. ATKINS.

References Cited in the file of this patent

UNITED STATES PATENTS

| Number | Name | Date |
|---|---|---|
| 976,400 | Salzer | Nov. 22, 1910 |
| 1,587,207 | Ackerman et al. | June 1, 1926 |
| 1,989,980 | Hamer | Feb. 5, 1935 |

FOREIGN PATENTS

| Number | Country | Date |
|---|---|---|
| 507,008 | Germany | Sept. 11, 1930 |